Aug. 6, 1957  G. H. DEWITZ  2,802,185
SATURABLE CONTROL SYSTEM
Filed July 24, 1952  2 Sheets-Sheet 1

INVENTOR
GERHARD H. DEWITZ
BY
Curtis, Morris & Safford
ATTORNEYS

INVENTOR
GERHARD H. DEWITZ
BY
ATTORNEYS

United States Patent Office 2,802,185
Patented Aug. 6, 1957

2,802,185

SATURABLE CONTROL SYSTEM

Gerhard H. Dewitz, Westport, Conn., assignor to C. G. S. Laboratories, Inc., Stamford, Conn., a corporation of Connecticut Application July 24, 1952, Serial No. 300,746

35 Claims. (Cl. 336—155)

This invention relates to saturable reactors of the type using ring cores and more particularly to methods and apparatus for minimizing coupling between the windings and for improving the control and operating characteristics of the reactors.

In the usual saturable reactor device, a first winding, called the control winding, carries the control current that produces magnetic flux to partially saturate the core; a second winding, the signal winding, carries an alternating current whose magnitude depends upon the extent of saturation of the core and therefore upon the magnitude of the control current.

In order to prevent coupling between these two windings, in the same manner that energy is coupled from the primary to the secondary winding of a transformer, one of the windings usually is formed in two equal parts wound in opposition on the core so that the voltage induced in one part of the winding is cancelled by the exactly equal voltage of opposite polarity induced in the other part.

The present invention provides for the isolation of the windings without the necessity of winding precisely balanced portions of the windings in opposition; and also for saturable reactors having three or more separate windings each well isolated from the other and without mutual coupling.

Improved control characteristics are obtained by the use of control flux that is not superimposed parallel on the flux produced by the signal winding. For example, by arranging the windings so that the flux produced by the control winding is substantially perpendicular to the flux produced by the current through the signal winding, the windings have no net flux path in common and are therefore not mutually coupled.

These and other objects, aspects, and advantages of the present invention will be in part pointed out in and in part apparent from the following description considered in connection with the accompanying drawings, in which.

Figure 1:
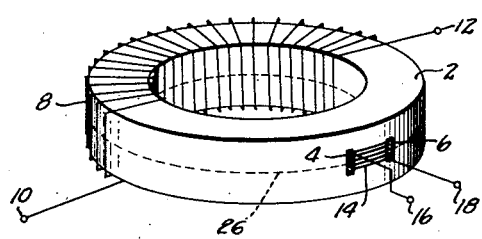
Figure 1 is a perspective view representing diagrammatically a saturable core having two windings without substantial mutual coupling between them.

The present invention has particular utility in reactors using ring-type cores, particularly cores formed of ferromagnetic ceramic material such as is described by Snoek in U. S. Patents 2,452,529; 2,452,530; and 2,452,531. Figure 1 shows diagrammatically a ring-type core 2 of such ferromagnetic ceramic material having two spaced transverse slots 4 and 6 in it. A control winding 8 is wound on the core 2 and is connected to the control terminals 10 and 12. A signal winding 14 is wound through the slots 4 and 6 and connected to the signal terminals 16 and 18.

It will be noted that the axis of the control winding 8 extends along the annular path of the core 2, but the axis of the signal winding 14 extends parallel with the axis of the core 2 and transversely to the path of the flux generated by the control winding 8 in the core 2. The axis of a winding is assumed to be in the direction of flux produced in the space surrounded by the turns of the winding by current through the winding.

Figure 2:
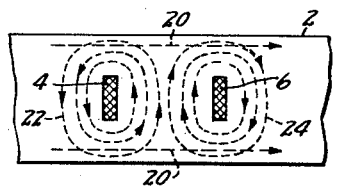
Figure 2 is an enlarged partial view with certain of the flux paths indicated in broken lines for aid in explaining the operation of the reactor device of Figure 1.

Figure 2 indicates the direction of the flux paths adjacent the slots 4 and 6. The lines 20 indicate the path of flux produced by the control winding 8. The lines 22 indicate the flux lines around the slot 4 produced by the winding 14 and the lines 24 indicate the flux lines produced by the same winding around the other slot 6.

It will be noted that in the upper portion of Figure 2, the flux lines 20 are opposed by the flux lines 22 and aided by the flux lines 24. On the lower side of the slots, the flux lines 20 are aided by the flux lines 22 and opposed by the flux lines 24. Thus, there is no net coupling between the windings if the same number of flux lines aid the flux lines 20 as oppose them. This condition can be realized by using a ring-shaped core and symmetrical construction. The flux lines produced by the current in the portions of the winding 14 between the slots 4 and 6 are perpendicular to the flux lines 20 and do not couple with them.

The arrangement of the windings just described produces a marked decrease in the apparent hysteresis of the signal winding 14 and thus increases the utility of the incremental permeability effect in precision applications.

The core 2 can be molded or otherwise formed as an integral unit with the openings 4 and 6 cast therein at the time of fabrication, or the holes can be drilled subsequently. Alternatively, the core can be formed in two portions each having two cut-out portions so that when the two halves are joined, as along the broken line 26 in Figure 1, these cut-out portions form the slots 4 and 6. The latter construction facilitates placing the winding 14 on the core as it may be pre-wound and positioned on the core-halves before they are joined.

The holes 4 and 6 may be rectangular as illustrated or of any other desired shape such as circular, oval, etc. Instead of extending radially through the core 2, these holes can be placed perpendicularly to their present direction so that they extend sideways through the core parallel to the axis of the core 2. This construction will minimize the coupling as in the previous example and will reduce the apparent hysteresis of the signal winding, but is more difficult to fabricate than the construction first described.

Figure 3:
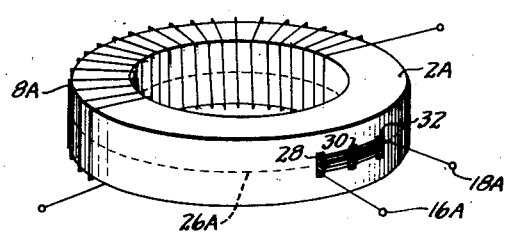
Figure 3 is a diagrammatic perspective view showing a winding arrangement different from Figure 2 and providing an increased area of flux control.
Figure 4:
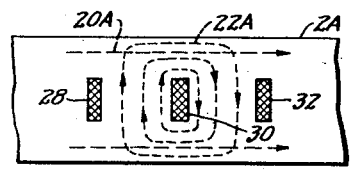
Figure 4 is an enlarged partial view of the reactor device of Figure 3 with certain of the flux paths indicated in broken lines for aid in explanation.

Figure 3 shows a somewhat different arrangement in which three spaced holes 28, 30, and 32 are provided in a core 2A which carries a control winding 8A. A signal winding 14A is wound in two sections through the three holes or in a figure 8 pattern; that is, each turn of the winding follows a path extending inwardly through the hole 28, along the inner surface of the core 2A, outwardly through the center hole 30, along the outer surface of the core, in through the hole 32, back along the inner surface, outwardly through the center hole 30, and along the outer core surface to the hole 28. As in the previous example, the flux lines 20A of the control winding 8A do not couple with the flux lines 22A produced by the current through the signal winding 14A.

The latter arrangement lengthens the path of signal winding flux which is parallel to the flux created by the control winding and reduces the proportion of signal winding flux which is transverse to the control flux.

Figure 5:
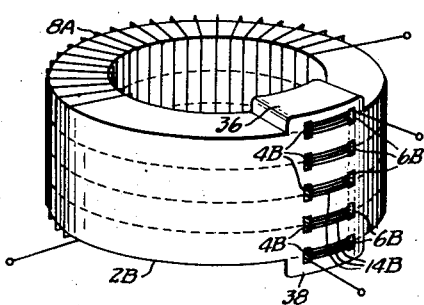
Figure 5 is a diagrammatic perspective of a saturable control device in which the signal winding is divided into a number of sections spaced across the width of the core.

Figure 5 shows another arrangement for providing still further improvement in the control characteristics. A core 2B, either solid or formed of a number of ring cores in face-to-face position, has a row of five radial slots 4B at spaced intervals across the width of the core; and a second row of five slots 6B are spaced circumferentially therefrom in corresponding positions across the width of the core. Two core-extensions 36 and 38 are provided, one on each side of the core adjacent the holes 4B and 6B. These core-extensions may be formed integrally with the core 2B or they may be formed separately and secured to the core. These core-extensions provide a low reluctance path for the flux of the signal winding 14B.

Figure 6:
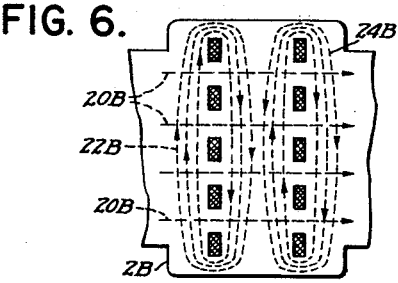
Figure 6 is an enlarged partial face view of the core of Figure 5 showing the path of certain of the flux lines.

The signal winding 14B is formed of five individual winding sections each wound between a corresponding pair of the holes 4B and 6B. These windings are connected in series-aiding so that they form a single winding that produces flux lines as indicated at 22B and 24B as shown in Figure 6. As explained above, there is no net coupling between these flux lines and the flux lines 20B from the control winding 8B. This arrangement is particularly effective in providing good control characteristics with maximum cancellation of hysteresis of the signal winding 14B.

Figure 7:
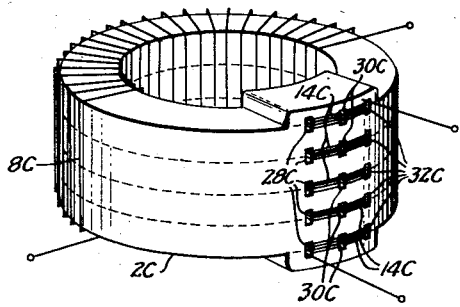
Figure 7 shows a core arrangement similar to Figure 6 in which each section of the signal winding is wound through three circumferentially-spaced holes.
Figure 8:
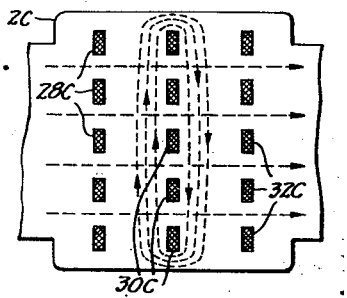
Figure 8 is an enlarged partial view of the structure of Figure 7 showing the paths of certain flux lines for aid in explaining the operation.

Figure 7 shows a modified arrangement in which three rows of slots 28C, 30C, and 32C are used somewhat in the manner described in connection with Figure 3. Each of the winding portions which form the signal winding 14C are wound in a figure 8 pattern through three of the holes 28C, 30C, and 32C that are in peripheral alignment on the core 2C. These winding portions are connected in series so that their flux patterns combine as shown in Figure 8. The operation is similar to that of the structure shown in Figure 5, but the arrangement shown in Figure 8 provides a substantially increased region of saturation control.

Figure 9:
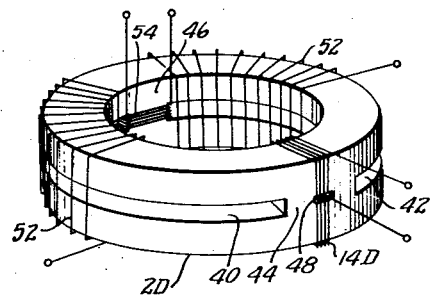
Figure 9 shows a core arrangement in which three separate windings are all positioned on a common core but without substantial mutual coupling of one to another.

In some instances, it is desirable to provide three or more windings without mutual coupling between any of the windings. For example, it is sometimes important to provide for the mutual control of the signal current by two or more separate sources and at the same time to prevent mutual coupling between the two sources and between each of the sources and the signal current. Figure 9 illustrates an arrangement for this purpose.

A ring core 2D is provided with two opposed peripheral slots 40 and 42, each of which is centered along the width of the core and extends slightly less than one-half the distance around the core 2D so as to form a bridging portion 44 between the two slots at one side of the core 2D and a second bridging portion 46 at the other side of the core between the opposite ends of the slots. These slots can be formed by machining a solid core or the core may be built up from multiple segments.

A hole 48 in the bridge portion 44 permits a signal winding 14D to be wound in two portions each extending through the hole 48 and around opposite rims of the core 2D. These two winding portions are connected in series so that current through this winding produces flux lines 50 (see also Figure 10). If desired, the winding 14D may be wound in figure 8 manner as described above.

A control winding 52 is wound in two portions, each around one of the slotted portions of the core 2D and having its axis along the circular path of the core. The two winding portions are connected in series to produce aiding circumferential flux 56 in the core 2D.

A second control winding 54 is wound through the slots 40 and 42 and around the connecting bridge 46. The axis of this winding is parallel with the axis of the core 2D.

Figure 10:
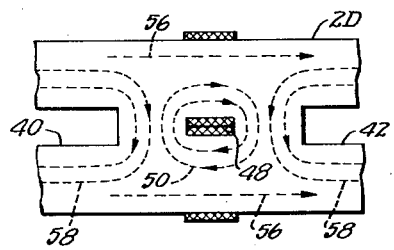
Figure 10 is an enlarged partial view of the core of Figure 9 showing the paths of certain flux lines for aid in explaining its operation.

The incremental inductance of the signal winding 14D is controlled mutually by the flow of current through the higher impedance control winding 52 and by the independent flow of current through the lower impedance control winding 54. No one of these windings, however, is coupled to any other winding. As best shown in Figure 10, the flux lines 50 around the hole 48 aid the flux lines 56, produced by the control winding 52, on one side of the hole and oppose these flux lines on the other side of the hole so that there is no set coupling. The flux lines 58 from the winding 54 extend through the core alongside the slot 40, around the end of this slot, and back to the winding 54. These flux lines oppose the flux lines 56 of the winding 52 on one side of the slot 40 and aid these flux lines on the other side of the slot, so that with symmetrical construction there is substantially no coupling. Similarly, flux lines 58 from the winding 54 surround the slot 42 and are isolated in the manner just described.

Figure 11:
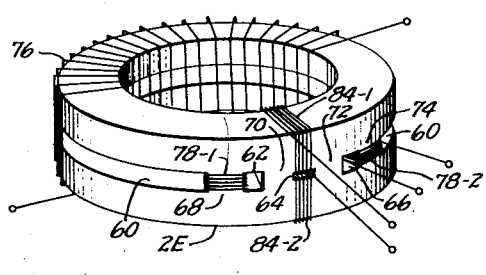
Figure 11 shows a winding arrangement by which three or four separate windings may be positioned on a single core without undesirable interaction.
Figure 12:
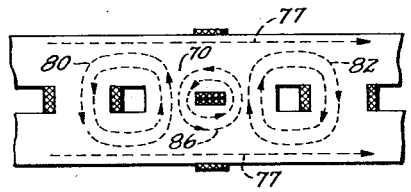
Figure 12 is an enlarged partial view of the core of Figure 11 indicating certain of the flux lines.

Figure 11 shows another arrangement in which a circumferential slot 60 extends more than one-half way around the core 2E. Three spaced slots 62, 64, and 66 aligned with and positioned between the ends of the slot 60 form four bridge portions 68, 70, 72, and 74. A first control winding 76 is wound around the portion of the core 2E having the slot 60 and produces parallel circumferential flux lines 77 in the core 2E.

A second control winding 78 is wound in two portions 78-1 and 78-2 connected in series to produce opposing flux lines 80 and 82 as shown. The winding 78-1 is wound around the bridging core portion 68 and extends through the slot 60 and the hole 62. The other portion 78-2 of this winding extends through the hole 66 and the slot 60 and surrounds the bridging core portion 74.

A signal winding 84 is wound in two portions 84-1 and 84-2 which are connected in series aiding to produce the flux lines 86. The winding portion 84-1 extends through the slot 64 and around one edge of the core 2E; the other portion 84-1 also extends through the hole 64 but is wound around the opposite edge portion of the core.

The flux lines 86 of the signal winding 84 oppose the flux lines 80 of the control winding portion 78-1 in the connecting bridge 70, but in the connecting bridge 72 they aid the flux lines 82 of the other part of 78-2 of this conrol winding. The two winding portions 78-1 and 78-2 are identical so that equal flux is produced by each winding. Accordingly with the symmetrical construction illustrated, there is no coupling between the signal winding 84 and the control winding 78.

The circumferential flux lines 77 of the control winding 76 do not have any net coupling with the flux lines of either of the other windings because on one side of the core slots the flux lines add while on the opposite side of the slots the flux lines are opposed.

The slot 60 can be divided into two parts so as to leave a connecting bridge like the bridge 46 of Figure 9. This permits still another winding, corresponding to the winding 54 of Figure 9 to be positioned on the core 2E.

Figure 13:
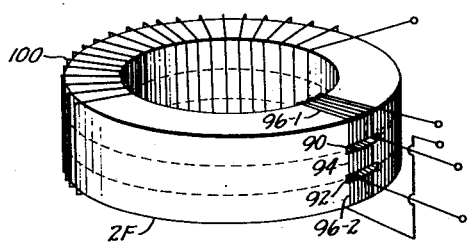
Figure 13 shows another core arrangement in which three separate windings are positioned on a single core.

Figure 13 shows an arrangement in which a ring core 2F has two slots 90 and 92 positioned side by side and extending lengthwise along the periphery of the annular core. A signal winding 94 extends through the slots 90 and 92 and surrounds the core material between these slots.

A first control winding 96 is formed of two portions 96-1 and 96-2. The portion 96-1 is wound through the slot 90 and around the outer edge portion of the core 2F. The other portion 96-2 is wound through the slot 92 and around the other edge portion of the core and is connected in series-aiding with the first portion 96-1 so that flux lines as indicated at 98 in Figure 14 are produced.

Because of the balanced arrangement of the winding 96-1 and 96-2 relative to the winding 94, there is no mutual coupling between these windings.

Figure 14:
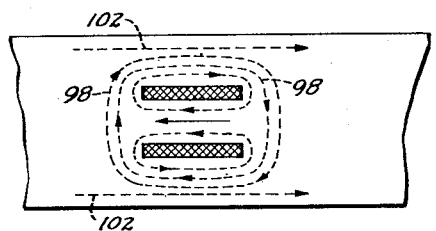
Figure 14 is a partial enlarged view of the core of Figure 13 showing the paths of certain flux lines produced in the core.

A second control winding 100 is wound on the core 2F and produces parallel circumferential flux lines 102 as indicated in Figure 14. In passing the windings 94 and 96, these flux lines are aided and opposed by the same number of flux lines so that there is no mutual coupling between the control winding 100 and either of the other windings.

Figure 15:
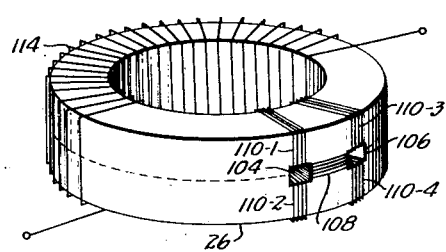
Figure 15 shows another arrangement of three windings on a single core.

Figure 15 shows an arrangement in which both parallel and orthogonal saturation control is provided. A core 2G has two circumferentially spaced holes 104 and 106. The signal winding 108 is wound through these two holes and around the core material between them. The axis of this winding is parallel with the axis of the core 2G.

Figure 16:
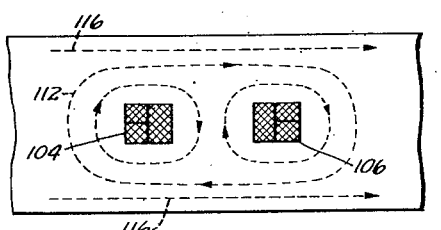
Figure 16 is an enlarged partial view of the core of Figure 15 indicating the paths of certain of the flux lines.

A first control winding 110 includes four sections 110-1; 110-2; 110-3; and 110-4. The winding sections 110-1 and 110-2 extend through the hole 104 and are wound around opposite edge portions of the core 2G. The sections 110-3 and 110-4 extend through the hole 106 and are wound around opposing edge portions of the core 2G. These winding sections are all connected in series-aiding to produce the flux lines 112 (Figure 16). This balanced arrangement prevents any mutual coupling between the control winding 110 and the signal winding 108.

A second control winding 114 around the core 2G provides circumferential flux, as at 116, that on one side of the slots 104 and 106 is opposed by the flux of windings 108 and 110 and on the opposite side of these slots is aided by an equal number of flux lines. There is, therefore, no mutual coupling between the control winding 114 and either of the other windings.

From the foregoing, it will be apparent that the saturable reactors embodying the invention are well adapted for the attainment of the ends and objects hereinbefore set forth, and that they are subject to various modifications so as to best suit the needs of each particular use.

This application is a continuation-in-part of my co-pending application, Serial No. 213,548, filed March 2, 1951.

I claim:

1. A saturable core reactor comprising a closed core of saturable ferromagnetic material having a plurality of groups of three spaced circumferentially-aligned openings therein, corresponding holes of each of said groups being positioned in spaced alignment along a line parallel with the axis of said core, a first winding wound on said core and having its axis extending along the closed path of the core, and a second winding comprising a plurality of series-connected winding portions each extending in figure 8 fashion through one group of three of said holes and having axes directed parallel with the axis of said core.

2. A saturable core reactance device comprising a closed core of saturable ferromagnetic material having a plurality of groups of three circumferentially-aligned openings therein, said groups being equally spaced across the width of said core with corresponding holes of each of said groups positioned in spaced alignment across the width of said core, a first winding wound on said core and having its axis extending along the path of said core, and a second winding comprising a plurality of winding portions connected in series-aiding arrangement and each extending in figure 8 fashion through one group of three of said holes and having axes directed across the width of said core.

3. A saturable core reactance device comprising a closed core formed at least partially of saturable ferromagnetic material having a plurality of groups of first, second, and third spaced circumferentially-aligned holes therein, corresponding holes of each of said groups being positioned in spaced alignment along a line parallel with the axis of said core, a first winding wound on said core and having its axis extending along the closed path of the core, and a second winding including a plurality of winding portions each extending through one of the groups of three holes, each of said portions including a first section wound through the first and second of the openings of the group and a second section interconnected with the first section and wound through the second and third openings of the same group.

4. A saturable core reactance device comprising a closed core of ferromagnetic ceramic material having a plurality of groups of three spaced circumferentially-aligned openings therein, corresponding holes of each of said groups being positioned in spaced alignment along a line parallel with the axis of said core, said core being substantially wider in a direction parallel to the axis of said core in the vicinity of said holes than at other points around its periphery, a first winding wound on said core and having its axis extending along the path of the core, and a second winding comprising a plurality of winding portions each extending through one of the groups of three holes.

5. A saturable core reactor comprising a core of saturable ferromagnetic material defining a large central hole and forming a closed peripheral magnetic path passing around said hole, said core having a plurality of pairs of spaced peripherally aligned openings therein, corresponding openings of each of said pairs being positioned in spaced alignment along a line perpendicular to the peripheral length of said core, a first winding wound on said core and having its axis extending along the peripheral length of the core, and a second winding comprising a plurality of winding portions connected in circuit in series relationship, said winding portions each extending through one pair of said openings and each having its axis directed perpendicular to the peripheral length of said core.

6. A saturable core reactor comprising a closed core of saturable ferromagnetic material defining a closed flux path therein and having a plurality of pairs of spaced openings therein, the openings of each pair being aligned with one another and being spaced apart in a direction along the length of said flux path, corresponding openings of each of said pairs being substantially equally spaced in alignment along a line substantially perpendicular to the length of said flux path of said core, a first winding wound on said core and having its axis extending along the flux path of the core, and a second winding comprising a plurality of winding portions connected in circuit in series-aiding relationship and each extending through one pair of said openings and having its axis directed substantially perpendicular to the flux path of said core.

7. A saturable core reactor comprising a closed core of saturable ferromagnetic material defining a flux path passing peripherally around a hole and having a plurality of pairs of spaced peripherally aligned openings therein, corresponding openings of each of said pairs being positioned in spaced alignment along a line parallel with the axis of said hole, said core having increased width in the direction of said axis along the portion adjacent said openings, a first winding wound on said core and having its axis extending along the flux path of the core, and a second winding comprising a plurality of winding portions connected in circuit in series relationship and each extending through one pair of said openings and having its axis directed parallel with said axis of said hole.

8. A saturable core reactor comprising a closed ring-shaped core of saturable ferromagnetic material formed of a plurality of separate rings of identical diameter arranged coaxially and in contact, said rings having notches arranged to form a plurality of pairs of spaced circumferentially-aligned openings in the core, corresponding openings of each of said pairs being equally spaced in alignment along a line parallel with the axis of said core, a first winding wound on said core and having its axis extending along the circular path of the core, and a second winding comprising a plurality of winding portions connected in circuit in series and each extending through one pair of said openings and having its axis directed parallel with the axis of said core.

9. A saturable core reactor comprising a core of ferromagnetic ceramic material defining a flux path having five pairs of spaced openings therein aligned along the length of said path, corresponding holes of each of said pairs being positioned in spaced alignment along a line substantially perpendicular to the flux path of said core, a control winding wound on said core and extending a substantial distance along the flux path of the core, and a signal winding comprising a plurality of winding portions connected in circuit in series and each extending through one pair of said openings and having its axis directed parallel with said line, the flux produced by current through said control winding extending along the flux path of said core and being substantially orthogonal to flux produced by current through said signal winding.

10. A saturable reactor utilizing the incremental permeability effect comprising a ring core of saturable ferromagnetic material having first, second, and third spaced radial openings therein, a first winding on said core having its axis extending along the circular path of said core, and a second figure 8 winding extending through said three openings and having its axis parallel with the axis of said core.

11. A saturable reactance device utilizing the incremental permeability effect comprising a ring core of saturable ferromagnetic material having first, second, and third circumferentially-spaced openings therein, said openings being positioned along a circumferentially-extending center line of said core, a first winding on said core having its axis extending along the circular path of said core, and a second figure 8 winding extending through said three openings and having its axis parallel with the axis of said core.

12. A saturable reactance device utilizing the incremental permeability effect comprising a core of saturable ferromagnetic material forming a predetermined flex path therein and having first, second, and third spaced openings extending transversely to said flux path and being aligned with one another and positioned respectively in sequence along the length of said flux path therein, a first winding on said core having its axis extending along the path of said core, and a second winding extending through said three openings and including a first portion extending through said first and second openings and a second portion extending through said second and third openings, said winding portions being so interconnected that current through said second winding will produce flux lines between said first and second openings in a direction opposite to flux lines produced thereby between said second and third openings.

13. A magnetic control element comprising a core formed of ferromagnetic ceramic material, said core defining a large central opening and forming a periphery around said opening and having first, second, and third peripherally spaced holes therein, said holes being positioned approximately equi-distant from the edges of the core, a control winding extending around the cross-section of said core and along a substantial portion of its peripheral length, and a signal winding spaced from the control winding and extending in figure 8 fashion through said first, second, and third holes and surrounding the respective portions of the core therebetween, whereby current through said control winding will vary the magnetic saturation of the flux path of the signal winding and the mutual coupling between the windings will be minimized.

14. A saturable-core reactor comprising a closed core of saturable ferromagnetic material having spaced slots therein the longest dimensions of which extend longitudinally along said core, a first winding around said core and having its axis along the closed path of the core, so as to produce flux throughout the length of the closed core and a second winding around a portion of the core between said slots and having its axis directed parallel with the axis of said core and perpendicularly to the flux produced by said first winding.

15. A saturable-core reactor comprising a core of saturable ferromagnetic material having spaced slots therein extending longitudinally along said core and a transverse opening between adjacent ends of said slots, a first winding around said core and having its axis along the longitudinal length of the core, a second winding around a portion of the core between said slots and having its axis directed parallel with the axis of said core, and a third winding extending through said hole and around the adjacent edge portion of said core.

16. A saturable-core reactor comprising a closed core of saturable ferromagnetic material having spaced aligned slots therein extending circumferentially along said core and a radial opening positioned between adjacent ends of said slots, a first winding around said core and having its axis along the path of the core, a second winding around a portion of the core between said slots and having its axis directed parallel with the axis of said core, and a third winding having a first portion extending through said opening and around one edge of said core and a second portion connected in series therewith and extending through said opening and around the opposite edge of said core.

17. A saturable-core reactor comprising a core of saturable ferromagnetic material having spaced slots therein extending circumferentially along said core and a radial opening between adjacent ends of said slots, a first winding around said core and having its axis along the circular path of the core, and a second winding extending through said hole and around the adjacent edge portion of said core.

18. A saturable-core reactor comprising a core of saturable ferromagnetic material having two aligned, spaced slots therein extending circumferentially along said core forming first and second bridge portions between adjacent ends of said slots, said slots being substantially longer than the intervening bridge portions, said second bridge portion having a radial opening therein, a first winding around said core and having its axis along the circular path of the core, said first winding including a first portion wound around a part of the core coincident with one of said slots and a second portion connected in series therewith and wound around a part of the core coincident with the other of said slots, a second winding extending through the ends of said slots and around said first bridge portion and having its axis directed parallel with the axis of said core, and a third winding having a first section extending through said opening and around one edge of said core and a second section connected in series therewith and extending through said opening and around the opposite edge of said core.

19. A reactance device as claimed in claim 18 wherein said core is formed of ferromagnetic ceramic material and in which said opening is in circumferential alignment with said slots.

20. A saturable-core reactor comprising a core of saturable ferromagnetic material having first, second, and third circumferentially-spaced openings therein, a first winding extending through said first and second openings and having its axis directed parallel to the axis of the core, and a second winding extending through said third opening and having its axis directed along the path of the core.

21. A saturable-core reactor comprising a closed core of saturable ferromagnetic material having first, second, third, fourth, and fifth circumferentially-spaced openings therein, a first winding extending through said first and second openings and having its axis directed parallel with the axis of the core, a second winding extending through said third opening and having an axis directed along the path of the core, said second winding including two portions extending respectively around opposite edges of said core, and a third winding extending through said fourth and fifth openings and having its axis directed parallel with the axis of the core, said first and third windings being positioned on opposite sides of said second winding and connected in series to produce opposing flux.

22. A saturable-core reactor comprising a closed core of saturable ferromagnetic material, first and second spaced circumferentially-extending slots therein forming first and second bridge portions between their adjacent ends, said first bridge portion having first, second, and third spaced openings therein, a first winding extending through said first slot and said first opening and having its axis directed parallel with the axis of the core, and a second winding extending through said second slot and said third opening and having its axis directed parallel with the axis of said core, said first and second windings being connected in series to produce opposing flux, a third winding positioned between said first and second windings and having two portions extending through said second opening and respectively around opposite edge portions of said core, and a fourth winding having two series-connected portions wound respectively around portions of said core coincident with said first and second slots.

23. A magnetic device as claimed in claim 22 including a fifth winding extending through said first and second slots and around said second bridge portion and having its axis directed parallel with the axis of said core.

24. In a saturable-core reactor, the winding arrangement comprising a closed core of saturable ferromagnetic material having first and second openings therein, said openings being spaced along a line substantially parallel with the axis of the core, a first winding extending through said openings and around the portion of the core between the openings, and a second winding including first and second series-connected portions, the first portion extending through the first opening and around a rim portion of the core, the second portion extending through the second opening and around the opposite rim portion of the core.

25. In a saturable-core reactor, the winding arrangement comprising a closed core of saturable ferromagnetic material having first and second openings therein, said openings being spaced along a line substantially parallel with the axis of the core, a first winding extending through said openings and around the portion of the core between the openings, a second winding including first and second series-connected portions, the first portion extending through the first opening and around a rim portion of the core, the second portion extending through the second opening and around the opposite rim portion of the core, and a third winding around the core and having its axis extending along the closed path of said core.

26. In a saturable-core reactor, the winding arrangement comprising a core of saturable ferromagnetic material having first and second slots therein, said slots extending longitudinally along the path of said core and being spaced along a line substantially parallel with the axis of the core, a first winding extending through said slots and around the portion of the core between the slots, a second winding including first and second series-connected portions, the first portion extending through the first slot and around a rim portion of the core, the second portion extending through the second slot and around the opposite rim portion of the core, and a third winding spaced from said slots and extending around the core and having its axis extending along the path of said core.

27. In a saturable-core reactor, the winding arrangement comprising a core of ferromagnetic ceramic material having first and second slots therein, said slots extending longitudinally along the path of said core and being spaced along a line substantially parallel with the axis of the core, a signal winding extending through said slots and around the portion of the core between the slots, and a first control winding including first and second series-connected portions, the first portion extending through the first slot and around a rim portion of the core, the second portion extending through the second slot and around the opposite rim portion of the core, and a second control winding having a substantially higher impedance than said first control winding and extending around the core and having its axis along the path of said core.

28. A saturable-core reactor comprising a core of saturable ferromagnetic material having first and second longitudinally-spaced openings therein, a first winding extending through said openings and around the portion of the core therebetween, and a second winding having first and second portions extending through the first opening and respectively around opposite rim portions of the core and second and third portions extending through the second opening and respectively around opposite rim portions of the core, said first, second, third, and fourth winding portions being connected in series.

29. Apparatus as claimed in claim 28 including a third winding around said core and having its axis directed along the path of said core.

30. Apparatus as claimed in claim 29 wherein all four portions of said second winding have equal impedances.

31. A saturable reactor utilizing the incremental permeability effect comprising a core of saturable ferromagnetic material defining a closed flux path therein and having first, second, and third spaced openings extending transversely to said flux path and aligned with one another, said openings being spaced along the length of said flux path, a first winding on said core having its axis extending along the length of the flux path of said core, and a second figure 8 winding extending through said three openings and having its axis substantially perpendicular to the length of the flux path of said core.

32. A saturable reactance device utilizing the incremental permeability effect comprising magnetically permeable saturable material defining a closed flux path therein and having first, second and third spaced openings each extending transversely to said flux path, said openings being positioned in sequence along the centerline of said flux path, a first winding around said material having its axis extending along the length of said flux path, and a second figure 8 winding extending through said three openings and having its axis substantially perpendicular to the centerline of said flux path.

33. A saturable reactor utilizing the incremental permeability effect comprising a ring core of saturable ferromagnetic material having a pair of circumferentially-spaced and circumferentially-aligned openings therein, a first winding around the outside of said core and having its axis extending along the circular path of said core and arranged to produce flux in said ring core extending along the circular path of said core, and a second winding extending through said pair of openings and having its axis extending in a direction parallel with the central axis of said ring core.

34. A saturable reactor utilizing the incremental permeability effect comprising ring core of saturable ferromagnetic material having a plurality of circumferentially spaced radial openings therein, a first winding on said core having its axis extending along the circular path of said core and arranged so that current through said winding produces flux throughout the circular length of the core, and a second winding extending through said openings and having its axis parallel with the central axis of said core and arranged so that the direction of flux produced by current in said second winding extends through the center of said second winding in a direction perpendicular to the flux produced at that point by current through said first winding.

35. A magnetic control element utilizing the incremental permeability effect and comprising a continuous closed core formed of magnetically saturable ferromagnetic material defining a magnetic flux path extending longitudinally therein and having a plurality of spaced holes therein, each hole extending transversely to said longitudinal path at its respective location along the path, said holes being spaced longitudinally along said path and being positioned approximately equi-distant from the edges of the core, a control winding extending around the entire cross-section of said core around said path and extending a substantial distance longitudinally along said path, and a signal winding spaced from the control winding and extending through at least two of said holes and surrounding the portion of the core therebetween, the axis of said signal winding being perpendicular to said longitudinal path at the location of said signal winding and being perpendicular to the direction of flux produced in said core by said control winding at the location of said signal winding, whereby current through said control winding will vary the magnetic saturation of the flux path of the signal winding and the mutual coupling between the windings will be minimized.

References Cited in the file of this patent

UNITED STATES PATENTS

| Re. 21,407 | Croden | Mar. 26, 1940 |
| 2,027,846 | Suits | Jan. 14, 1936 |
| 2,284,406 | D'Entremont | May 26, 1942 |
| 2,390,051 | Barth | Dec. 4, 1945 |
| 2,471,411 | Claesson | May 31, 1949 |

FOREIGN PATENTS

| 539,773 | Great Britain | Dec. 1, 1938 |